United States Patent
Suzuki et al.

[11] Patent Number: 5,466,143
[45] Date of Patent: Nov. 14, 1995

[54] DOUGH SHEET FORMER WITH CLOSED LOOP CONTROL

[75] Inventors: Minoru Suzuki; Yoshikazu Iguchi, both of Kanagawa, Japan

[73] Assignee: Oshikiri Machinery Ltd., Japan

[21] Appl. No.: 128,519

[22] Filed: Sep. 29, 1993

[51] Int. Cl.[6] ................................................ A21C 3/04
[52] U.S. Cl. ..................... 425/140; 425/141; 425/376.1; 425/377; 426/231; 426/502
[58] Field of Search .................................. 425/140, 141, 425/364 R, 376.1, 377; 426/502, 231; 73/865.8; 356/381, 384–386

[56] References Cited

U.S. PATENT DOCUMENTS

| | | | |
|---|---|---|---|
| 4,244,897 | 1/1981 | Moon | 425/140 |
| 4,276,480 | 6/1981 | Watson | 356/381 |
| 4,425,289 | 1/1984 | Lee et al. | 425/140 |
| 4,692,107 | 9/1987 | Morikawa et al. | 425/140 |
| 4,880,371 | 11/1989 | Spinelli et al. | 425/141 |
| 4,902,524 | 2/1990 | Morikawa et al. | 425/140 |
| 4,924,715 | 5/1990 | Schaffer | 73/865.8 |
| 4,954,719 | 9/1990 | Harris | 356/386 |
| 5,001,356 | 3/1991 | Ichikawa | 356/381 |
| 5,118,274 | 6/1992 | Morikawa et al. | 425/140 |
| 5,122,315 | 6/1992 | Darley | 425/140 |
| 5,209,939 | 5/1993 | Kempf | 425/141 |
| 5,232,713 | 8/1993 | Morikawa et al. | 425/140 |
| 5,253,039 | 10/1993 | Fujimoto et al. | 356/381 |

OTHER PUBLICATIONS

Japanese Patent Application of Minoru Suzuki et al. for Device for Delivering Belt-Shaped Dough; Filed Mar. 17, 1990; Publication Date: Sep. 19, 1991; Patent No. 3-266929.

*Primary Examiner*—James P. Mackey
*Attorney, Agent, or Firm*—Westman, Champlin & Kelly

[57] ABSTRACT

A dough extruder extrudes a sheet of dough. A ram is reciprocable within a chamber, the chamber having an entrance for receiving dough from the hopper and an exit. Reciprocation of the ram drives the dough from the entrance out the exit to form a sheet of dough. A driver is coupled to the ram for driving reciprocation of the ram. A sensor senses a characteristic of the sheet of dough and generates a sensing signal based on the characteristic sensed. A controller is coupled to the sensor and the driver and receives the sensor signal. The controller controls the driver based on the sensor signal received.

21 Claims, 6 Drawing Sheets

DOUGH SHEET FORMER WITH CLOSED LOOP CONTROL

BACKGROUND OF THE INVENTION

The present invention relates to pastry production line equipment. More specifically, the present invention relates to a dough sheet former for forming a sheet of dough.

Dough sheet formers are widely used in the baking industry. Dough sheet formers typically take some quantity of dough, in the form of a ball or other mass, and form a sheet from the mass of dough. Conventional dough sheet formers involve a number of rollers. The dough mass is typically conveyed through a plurality of sets of rollers, or back and forth through a single set of rollers, to flatten the dough and form the dough into a sheet.

The sheet, once formed, is commonly conveyed to other dough processing equipment for further processing. Such processing can include further reduction of the dough, as well as cutting or shaping the dough.

This conventional form of dough sheet formation has significant drawbacks. Moving a mass of dough through rollers to form a sheet produces a shear stress in the dough. Shear stress contributes to several undesirable qualities in the dough. For example, the shear stress can substantially impair or destroy rising in the dough. Shear stress can also significantly reduce shelf life and adversely affect fat absorption properties of the dough.

Thus, there have been attempts to produce dough sheet formers which create sheets of dough, from another mass of dough, without the use of rollers in order to overcome the problems created by the shear stress developed in the dough. One such attempt is set out in Japanese Patent No. 3-266929(8) assigned to Oshikiri of Tokyo, Japan, which was applied for in the Japanese Patent Office on Mar. 17, 1990, which issued on Jul. 13, 1993, and which is entitled "Device for Delivering Belt-Shaped Dough" (hereinafter referred to as "the Oshikiri reference"). The entire specification of the Oshikiri reference is hereby incorporated by reference.

The dough sheet former set out in the Oshikiri reference includes a hopper for receiving the dough. Dough moves down through the hopper into a chamber through which a rectangular shaped piston reciprocates. The chamber communicates with the hopper through an opening which is opened and closed, in synchronisity with reciprocation of the piston, by a shutter. The shutter opens as the piston withdraws to its non-extended position. This allows the piston to create a vacuum in the chamber and draw dough from the hopper into the chamber. The shutter then closes, sealing off communication between the chamber and the hopper. The piston then begins its reciprocating stroke, forcing dough through an output end of the chamber. The output end of the chamber is equipped with a nozzle that enlarges as dough is being pushed through it by the piston, and narrows as the piston withdraws. This inhibits the dough already extruded from being drawn back into the chamber by the vacuum created when the piston withdraws into its non-extended position.

However, the dough sheet former set out in the Oshikiri reference is limited in its effectiveness for a number of reasons. First, in the Oshikiri reference, the piston, the shutter and the nozzle are all driven by a single motor. The motor has a cam assembly which fixedly determines the relative timing of movement of the shutter, the piston and the nozzle with respect to one another. Thus, the length of travel of the shutter and the piston is also fixed by the physical characteristics of the cam assembly.

The fixed nature of this timing relationship poses significant practical problems, as not all dough can be processed in the same manner. In fact, it is desirable to vary processing of even a single batch of dough during a single processing period. For example, it is widely recognized that it is desirable to achieve a constant weight extruded per unit of time, or a constant volume at the output of the dough sheet former. Thus, dough which has different densities must be processed at different rates.

In addition, when the hopper is full of dough, more dough will be forced into the chamber, and hence be forced through the nozzle by each stroke of the piston than when there is very little dough in the hopper. Thus, dough processed early in the cycle is more dense than the dough processed later in the cycle. Also, many doughs include yeast. Yeast creates gas in the dough which changes the density of the dough. If the temperature of the dough is relatively high as it is introduced into the hopper, the density (and consequently, the specific gravity) of the dough can change significantly during a single processing cycle due to the action of the enzymes contained in the yeast.

SUMMARY OF THE INVENTION

The present invention arises from the recognition that, because it is desirable to have a substantially uniform weight or volume extruded per unit of time, and because the density of the dough can significantly change for a number of different reasons during a single processing cycle, it is desirable to be able to adjust the output of dough extruded to maintain the desired weight or volume. This is very difficult using the dough sheet former disclosed in the Oshikiri reference because the fixed cam assembly does not allow variation in the piston stroke length, and it does not allow variation in the timing of the moving members in the dough sheet former relative to one another.

The present invention is a controllable dough sheet former for extruding a sheet of dough. A hopper holds dough to be extruded. A ram is reciprocable within a chamber. The chamber has an entrance for receiving dough from the hopper and an exit. Reciprocation of the ram drives the dough from the entrance out the exit to form the sheet of dough. Drive means is coupled to the ram for driving the reciprocation of the ram. Sensor means senses a characteristic of the sheet of dough and generates a sensor signal based on the characteristic sensed. Controller means, coupled to the sensor and the drive means, receives the sensor signal and controls the drive means based on the sensor signal.

In one embodiment, there are a plurality of rams, independently reciprocable within the chamber. The sensor means is an optical sensor which senses the thickness and width of the dough sheet being extruded. The controller means controls the volume of dough being extruded based on the signal received from the optical sensor by controlling the speed and stroke distance of the independently reciprocable rams.

DETAILED DESCRIPTION OF THE PREFERRED EMBODIMENTS OVERALL OPERATION

Figure 1:
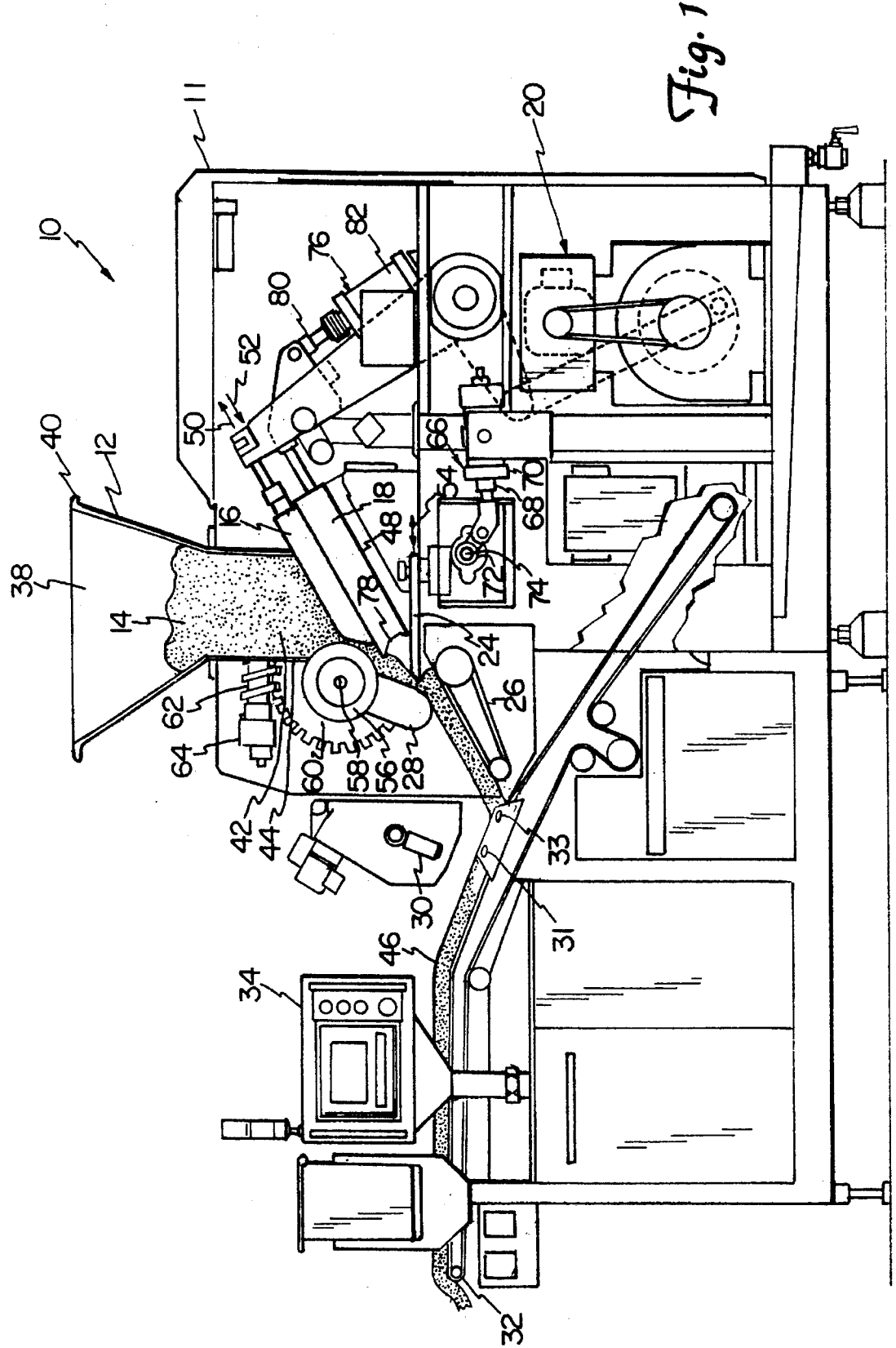
FIG. 1 is a side view of a dough sheet former of the present invention with portions cut away.

FIG. 1 shows a side view of dough sheet former 10 of the present invention with portions cut away. Dough sheet former 10 includes a hopper 12 which receives a mass of dough 14. Dough sheet former 10 also includes upper ram 16, lower ram 18, a first servomotor 20 for driving ram 18, a second servomotor 22 (shown in FIGS. 2 and 4) for driving ram 16, shutter 24, exit conveyor 26, manifold 28, optical sensor 30, table conveyor 32, and controller 34.

Hopper 12 has an upper opening 38 defined by a rim 40. Hopper 12 also has a lower opening 42 defined by a lower edge 44 of hopper 12. The mass of dough 14 is introduced into hopper 12 through opening 38. The mass of dough makes its way, under the force of gravity, toward the lower opening 42 of hopper 12. During operation, servomotors 20 and 22 are controlled by controller 34 to form a sheet of dough 46 from mass of dough 14.

Rams 16 and 18 reciprocate within a chamber defined by the lower edge 44 of hopper 12, and a housing 11 of dough sheet former 10, along with a lower slide surface 48.

To form a sheet of dough, controller 34 first controls servomotors 20 and 22 to pull rams 16 and 18 backward into their non-driving position, as indicated by arrow 50. By drawing the rams 16 and 18 backward in the direction indicated by arrow 50, a vacuum is created in the chamber in which rams 16 and 18 reciprocate. This vacuum draws dough from the mass of dough 14 down through hopper 12 into the chamber. When rams 16 and 18 are in their fully retracted position, controller 34 controls servomotors 20 and 22 to independently drive rams 16 and 18 forward in the direction indicated by arrow 52.

In one preferred embodiment, controller 34 controls servomotor 20 to drive ram 16 forward before servomotor 22 drives ram 18 forward. In this way, ram 16 forces dough toward an output end of the chamber. In addition, ram 16 substantially closes off opening 42 in hopper 12. Next, controller 34 controls servomotor 22 to drive ram 18 in the direction indicated by arrow 52. Ram 18 forces additional dough from the chamber toward the output conveyor 26. Because ram 16 has already reciprocated to its fully extended position, and since it has substantially closed off opening 42 in hopper 12, the movement of ram 18 toward its fully extended position forces substantially all of the dough toward the output end of the chamber and onto output conveyor 26, rather than back up into hopper 12.

Shutter 24 is movable in the direction indicated by arrow 54. As rams 16 and 18 drive dough from the chamber, shutter 24 is held in position withdrawn from the chamber. As rams 16 and 18 drive dough from the chamber, the dough is forced under manifold 28 and onto output conveyor 26. As the dough is forced under manifold 28, it is reduced to a dough sheet having a thickness dimension which is substantially equal to the distance that the lower portion of manifold 28 is from the upper portion of output conveyor 26.

The sheet of dough 46 is conveyed away from the chamber by output conveyor 26. As the sheet of dough 46 reaches the end of output conveyor 26, it engages table conveyor 32 which continues to move the dough along a dough travel path down the pastry production line.

Manifold 28

Manifold 28 is fixedly mounted to a shaft 56 which rotates about an axis 58. Shaft 56 is fixedly coupled to gear wheel 60. The teeth of gear wheel 60 engage a screw 62 which is driven by motor 64. Motor 64 is controlled by controller 34. Therefore, if an operator operating dough sheet former 10 desires to change the thickness dimension of the dough sheet, the operator simply uses controller 34 to control rotation of motor 64 in a desired direction so that screw 62 engages the gear wheel 60 to raise or lower manifold 28 with respect to output conveyor 26.

Interaction of Conveyors 26 and 32

Figure 3:
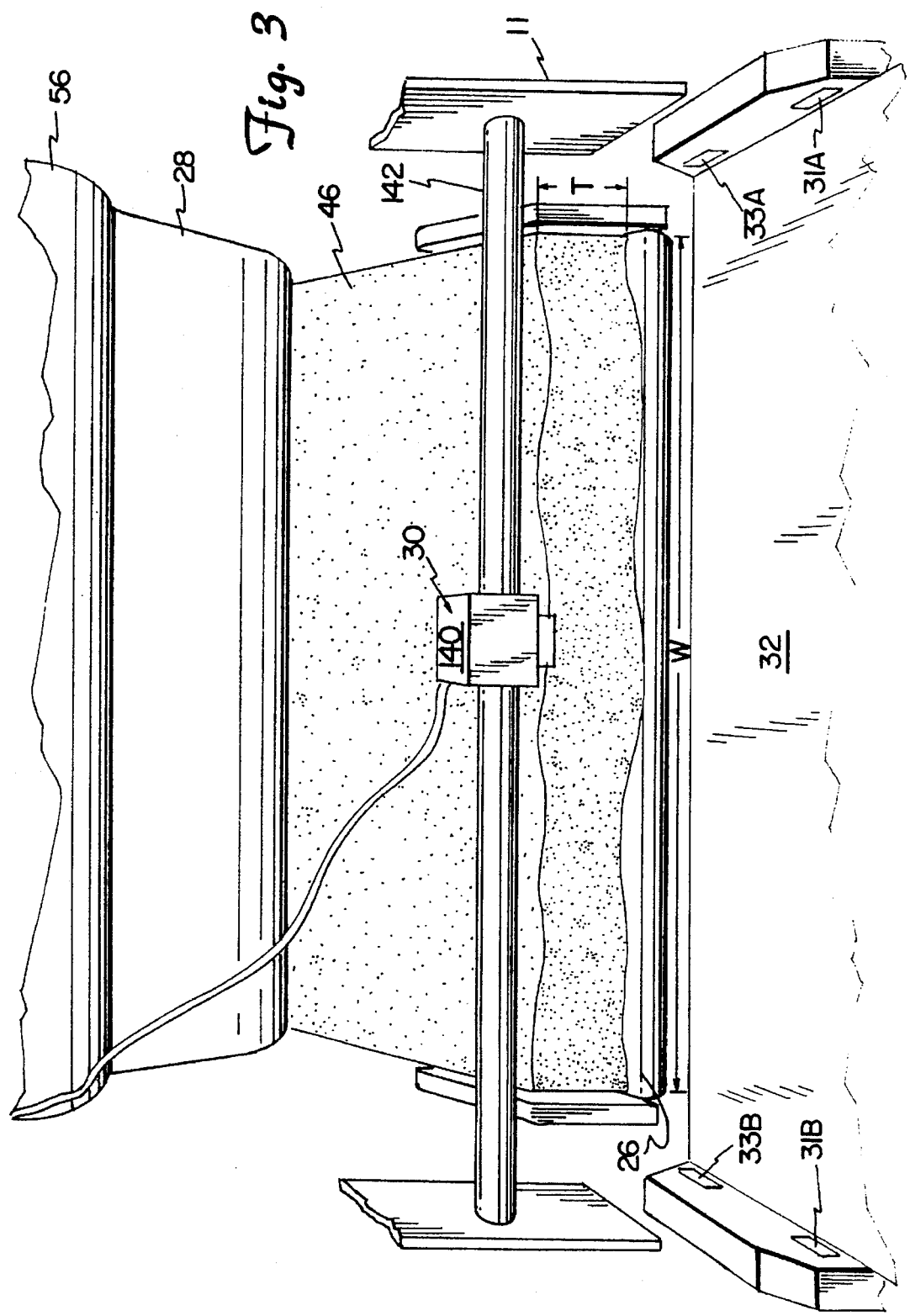
FIG. 3 is a front sectional view of the dough sheet former of FIG. 1 showing an optical sensor.

Optical sensors 31 and 33, as best seen in FIGS. 1 and 3, are mounted adjacent table conveyor 32 proximate the output end of output conveyor 26. In one preferred embodiment, optical sensors 31 and 33 each have a light emitter 31A and 33A on one side of dough sheet 46 directing light transverse to the dough travel path, and a light detector 31B and 33B on the other side of dough sheet 46. When the light detector detects light emitted from the light emitter, no dough is present along the dough travel path adjacent the optical sensors. However, when light is being emitted by the light emitter of one of the optical sensors and no light is detected by the corresponding detector, dough is present along the dough travel path adjacent the optical sensor. Table conveyor 32 and output conveyor 26 are, in one preferred embodiment, driven by the same motor with engageable clutches controlling movement of the conveyors. Therefore, as the dough sheet is conveyed down output conveyor 26 and moves between the light emitter 33A and detector 33B of optical sensor 33, it continues to be moved along by table conveyor 32.

As the dough sheet 46 is conveyed along table conveyor 32, it disrupts the light path between the light emitter 31A and detector 31B of optical sensor 31. At that point, output conveyor 26 is temporarily stopped. As table conveyor 32 continues to move, dough sheet 46 is pulled first at the junction between output conveyor 26 and table conveyor 32. Since output conveyor 26 is stopped, dough sheet 46 is lifted at that junction to a point where its lower surface rises above the light path between the light emitter 33A and detector 33B of optical sensor 33. When this occurs, optical sensor 31 indicates to controller 34 that dough sheet 46 is present, but optical sensor 33 indicates to controller 34 that dough sheet 46 is not present. Controller 34 then controls the clutch engaging output conveyor 26 causing conveyor 26 to be driven so that dough is conveyed by conveyor 26. This substantially eliminates any undesirable thinning of dough sheet 46. Since conveyor 26 preferably runs intermittently, controller 34 increases or decreases the frequency at which conveyor 26 runs, as desired. In either case, enough dough is conveyed by conveyor 26 so that the dough sheet 46 soon reshields detector 33B. This is detected by optical sensor 33, and controller 34 again stops output conveyor 26.

Shutter 24

Shutter 24 is driven by pneumatic or hydraulic actuator 66. As piston 68 is driven out of cylinder 70, piston 68 causes shaft 72 to rotate about axis 74. This rotation causes shutter 24 to move away from manifold 28 allowing the dough to be forced beneath manifold 28 to form dough sheet 46.

After rams 16 and 18 are both in their fully extended position (shown in FIG. 1), actuator 66 is controlled so that piston 68 retracts within cylinder 70. This causes shaft 72 to again rotate about axis 74 causing shutter 24 to engage dough 14. Once shutter 24 is in the position shown in FIG. 1, engaging dough 14, controller 34 controls servomotors 20 and 22 to cause rams 16 and 18 to return to their retracted position. This reciprocation of rams 16 and 18 causes a vacuum to be created in the chamber. Since shutter 24 is in the position shown in FIG. 1, (engaging the dough) when the vacuum is created, the vacuum draws dough from mass 14 in hopper 12 through opening 42 into the chamber, rather than from dough sheet 46.

Clean-out Control Sequence

Ram 18 is also coupled to pneumatic or hydraulic actuator 76. Controller 34 controls actuation of actuator 76. As the dough mass 14 moves down into the chamber and is processed through dough sheet former 10, all of the dough mass 14 may be processed, except for a very small portion located between a distal end 78 of ram 18 and manifold 28. In order to remove this last portion of dough from the chamber, and process it into dough sheet 46, an operator programs controller 34 to enter a clean-out control sequence. During the clean-out control sequence, controller 34 operates rams 16 and 18 to extend to their fully extended positions. When the rams reach their extended positions, shutter 24 is fully contracted in the direction indicated by arrow 54. However, during a clean-out sequence, controller 34 actuates actuator 76, extending piston 80 from cylinder 82. This actuation drives ram 18 further toward manifold 28 in the direction indicated by arrow 52. In essence, the actuation of actuator 76 increases the stroke length of ram 18 within the chamber. Controller 34 controls rams 16 and 18, and actuator 76, in this manner for a number of cycles. This cleans out substantially all dough 14 from the chamber, essentially eliminating waste.

Optical Sensors 30

FIGS. 1 and 3 more clearly illustrate the operation of optical sensor 30. Optical sensor 30 is provided above dough sheet 46. FIG. 3 is a front enlarged view of dough sheet former 10 showing optical sensor 30 with a portion of the housing which surrounds optical sensor 30 cut away. FIG. 3 also shows optical sensors 31 and 33.

Optical sensor 30 is movable in a direction transverse to the dough travel path. Dough sheet 46 is extruded beneath manifold 28 and approaches table conveyor 32 on output conveyor 26. Optical sensors 31 and 33 are coupled to controller 34 which controls operation of dough sheet former 10 based in part on the signals received from optical sensors 31 and 33, as previously described.

Dough sheet 46 has a thickness, designated by the dimension T, and a width, designated by the dimension W. Optical sensor 30 is mounted on a slide housing 140 and on slide rail 142. Slide rail 142 is mounted to dough sheet former housing 11.

Once optical sensor 31 detects that dough sheet 46 has progressed along table conveyor 32 past optical sensor 31, controller 34 waits for a desired number of additional strokes of rams 16 and 18 (the desired number can be set by an operator) and then causes optical sensor 30 to slide from one end of slide rail 142 to the other end. Optical sensor 30 directs a beam of light down toward table conveyor 32. Based upon the reflective properties of table conveyor 32 and dough sheet 46, optical sensor 30 senses both the thickness (T) and the width (W) of dough sheet 46. Controller 34 causes sensor 30 to sense the dimensions periodically. In one preferred embodiment, optical sensor 30 travels along slide 142 sensing the thickness and width of dough sheet 46 three times. Controller 34 then averages the dimensions for thickness and width taken for the three passes to determine an average width and thickness. Using the width and thickness measurements, controller 34 can determine the cross-sectional area of dough sheet 46 being extruded from dough sheet former 10. Since controller 34 also controls the linear speed of table conveyor 32, controller 34 can determine the volume of dough sheet 46 being extruded per unit of time.

Controller 34 also controls the speed at which rams 16 and 18 are forcing dough from the chamber, the actuation of output conveyor 26 and the speed of table conveyor 32. Thus, controller 34 is capable of controlling the volume of dough extruded per unit of time. This feature is highly desirable in pastry processing equipment, and will be discussed in greater detail later in the specification.

Driving Rams 16 and 18

Figure 2:
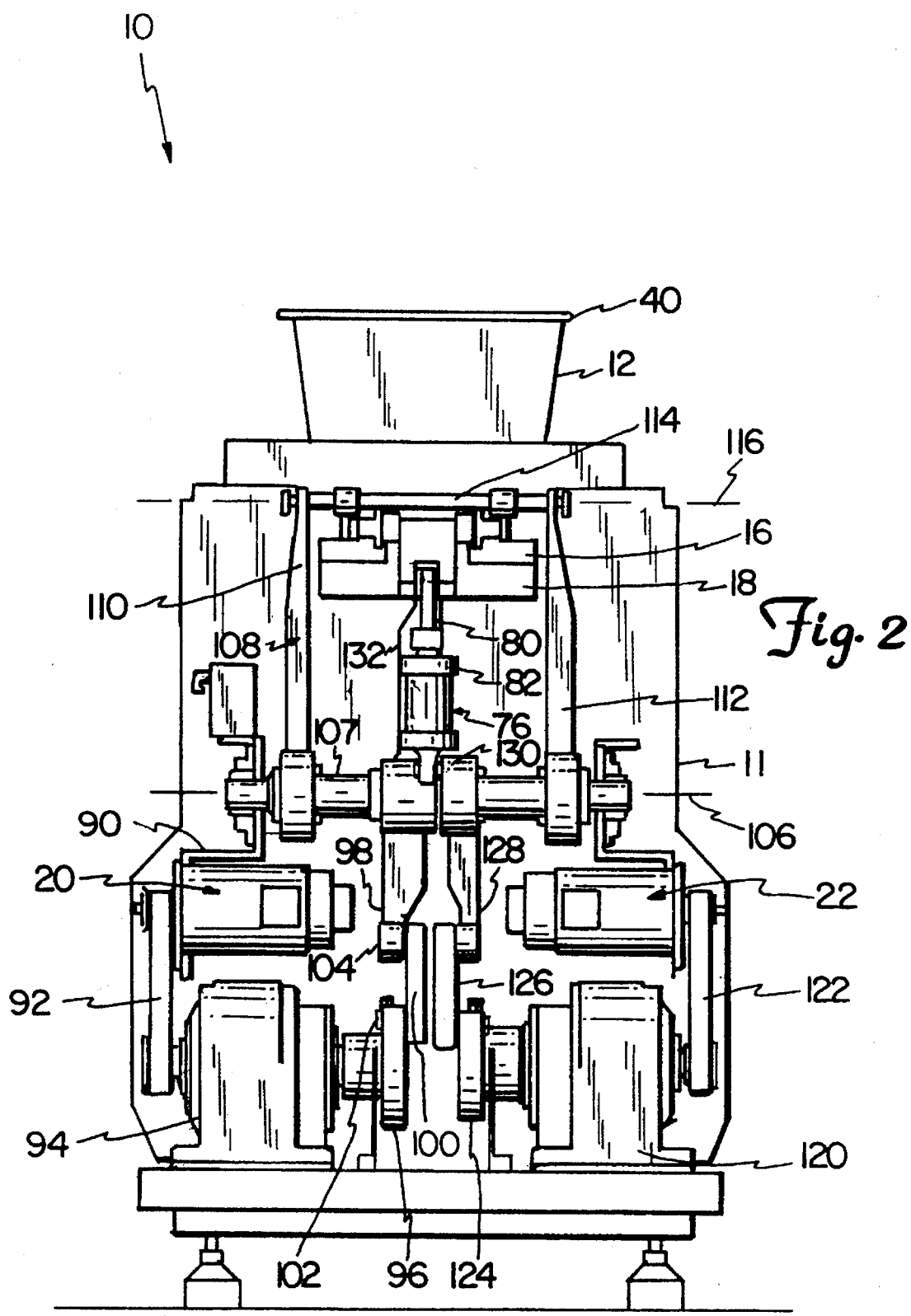
FIG. 2 is a rear view of the dough sheet former of FIG. 1 showing drive trains for two rams.

FIG. 2 is a rear view of dough sheet former 10 with the rear portion of housing 11 removed. Similar items shown in FIGS. 1 and 2 are numbered similarly.

Servomotor 20 is rigidly coupled to housing 11 by bracket 90. Servomotor 20 is also coupled to drive unit 94 by belt 92. Drive unit 94 performs gear ratio reduction functions and provides a rotational output to a bell crank arm 96. Bell crank arm 96 is coupled to lever arm 98 by coupling member 100. Coupling member 100 is pivotally coupled to both bell crank arm 96 and lever arm 98 at pivot points 102 and 104, respectively. Therefore, as bell crank arm 96 rotates, coupling member 100 causes lever arm 98 to rotate about an axis 106.

Lever arm 98 is rigidly coupled to cuff 107, which is in turn rigidly coupled to frame 108. Frame 108 includes upright members 110 and 112, and cross member 114. Cross member 114 is rotatably coupled to uprights 110 and 112 for rotation about axis 116, and is further coupled to ram 16. Therefore, as servomotor 20 rotates, belt 92 drives drive unit 94 which, in turn, drives the rotation of bell crank arm 96. Coupling member 100 couples bell crank arm 96 to lever arm 98 so that rotation of bell crank arm 96 causes lever arm 98, and consequently cuff 107 and frame 108, to rotate about axis 106. This rotation is transferred into linear movement of ram 16. The rotation drives ram 16 in one direction (either in the direction indicated by arrow 50 or arrow 52 in FIG. 1). Reversing rotation of servomotor 20 drives ram 16 in the opposite direction. By controlling the amount and speed of rotation of servomotor 20, controller 34 also controls the speed of reciprocation of ram 16, as well as the stroke distance of each reciprocal movement.

Reciprocation of ram 18 is driven in a similar manner. Servomotor 22 drives a drive unit 120 with a belt 122. Drive unit 120, in turn, drives rotation of a bell crank arm 124, which is coupled, by a coupling member 126, to a second lever arm 128. Lever arm 128 is rigidly coupled to a cuff 130 and a single upright 132. Cuff 130 and cuff 107 share a common shaft. Upright 132 is pivotally coupled to ram 18.

Thus, rotation of servomotor 22 drives rotation of lever arm 28 and cuff 130, as well as upright 132, about axis 106. This rotation is transferred into linear movement of ram 18 within the chamber. Hence, by controlling the speed and direction of rotation of servomotor 22, controller 34 also controls the speed of reciprocation of ram 18 within the chamber, and the stroke length of each stroke of ram 18.

Figure 4:
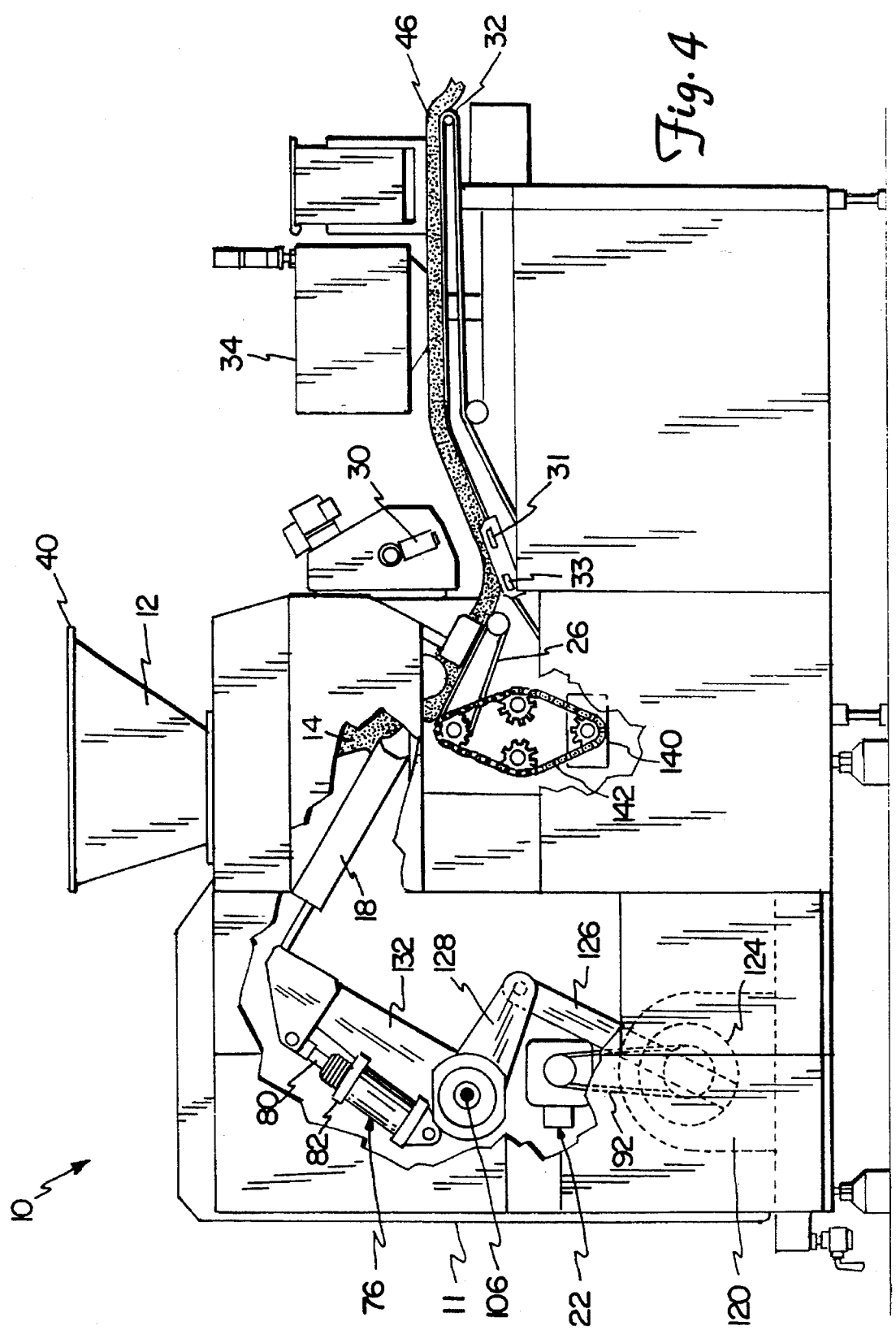
FIG. 4 is a second side view of the dough sheet former of FIG. 1 with portions cut away.

FIG. 4 is a side view of dough sheet former 10, showing the opposite side of that shown in FIG. 1, with portions broken away. Similar items are numbered similarly. FIG. 4 more clearly shows the drive train between servomotor 22 and ram 18. In addition, FIG. 4 shows that, in one preferred embodiment, output conveyor 26 is driven by another motor 140 and belt or chain 142. Motor 140 is preferably a servomotor, or stepper motor, which is controlled by controller 34. In another preferred embodiment, output conveyor 26 is driven by the same motor that drives table conveyor 32.

Reciprocation of Rams 16 and 18 in Detail

Figure 5:
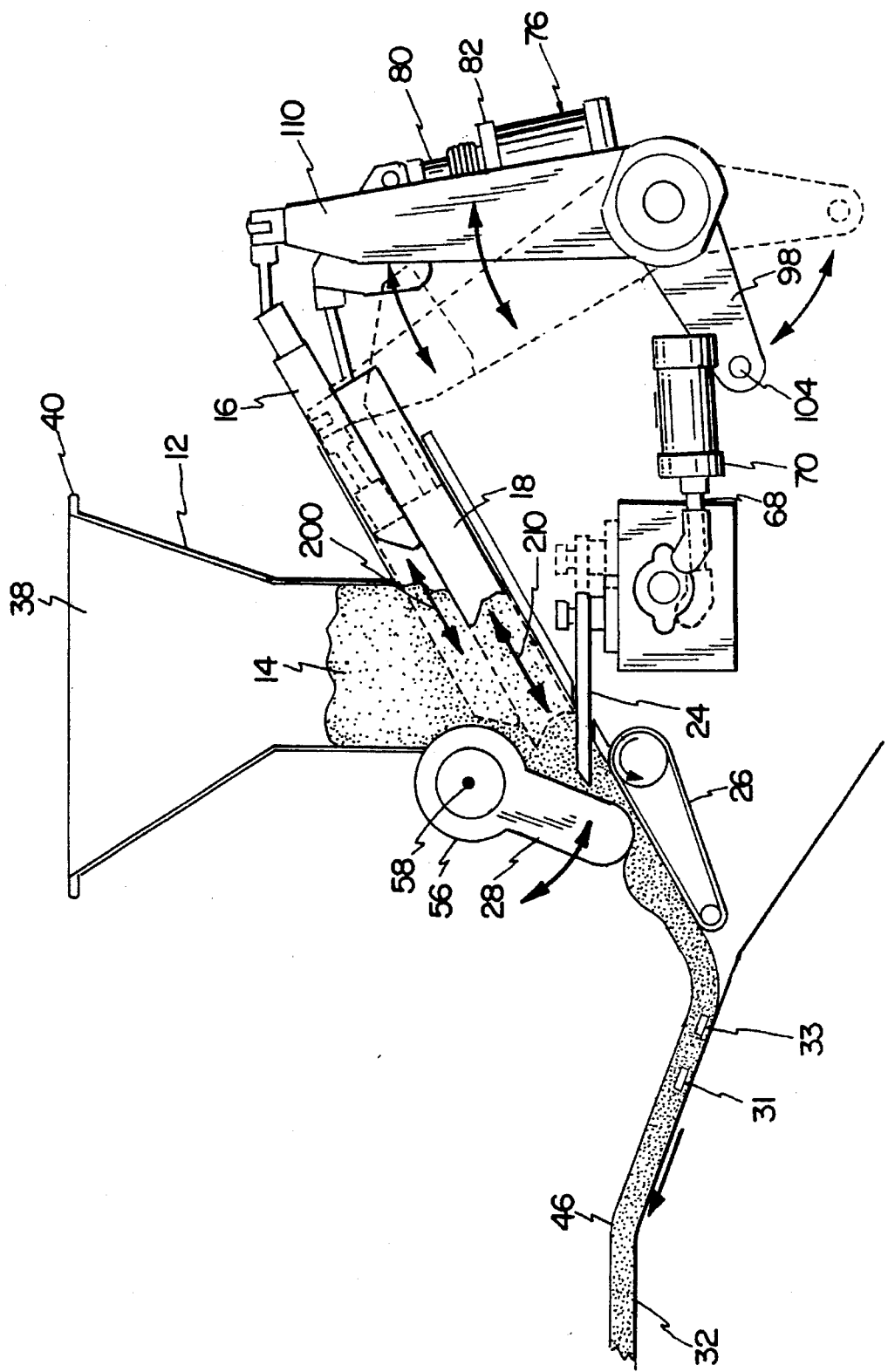
FIG. 5 is a more detailed view of rams operable in the dough sheet former of FIG. 1.

FIG. 5 is an enlarged sectional view which illustrates reciprocation of rams 16 and 18 within the chamber. FIG. 5 shows rams 16 and 18 in their fully retracted position. FIG. 5 also shows rams 16 and 18, in phantom, in their normal driving or extended position. During normal operation, rams 16 and 18 reciprocate within the chamber in the directions indicated by arrows 200 and 210. During the clean-out cycle, ram 18 repeatedly extends beyond the position, shown in phantom, toward manifold 28.

When rams 16 and 18 are in their normal driving position, shown in phantom, shutter 24 is also in the position shown in phantom in FIG. 5. Piston 68 extends from within cylinder 70, pivoting shutter 24 into the position shown in phantom in FIG. 5, thereby allowing rams 16 and 18 to extrude dough.

It should be noted that controller 34 can control servomotors 20 and 22 to control the stroke distance of both rams 16 and 18. Therefore, should controller 34 determine that a higher output volume is required, controller 34 can increase the frequency of reciprocation of rams 16 and 18, and increase the stroke distance. Should controller 34 determine that a lower volume is required, controller 34 can slow down reciprocation of rams 16 and 18, and also shorten the stroke distance of the rams. In that case, controller 34 may control rams 16 and 18 to move forward to their fully extended position intermittently. In other words, to achieve a lower output volume, controller 34 can control rams 16 and 18 to move, for example, one-third of the way toward their fully extended position, pause briefly, move another third of the way toward their fully extended position, again pause briefly, and finally move to their fully extended position. Controller 34 can control rams 16 and 18 in such a way either together or independently.

Control Circuit 220

Figure 6:
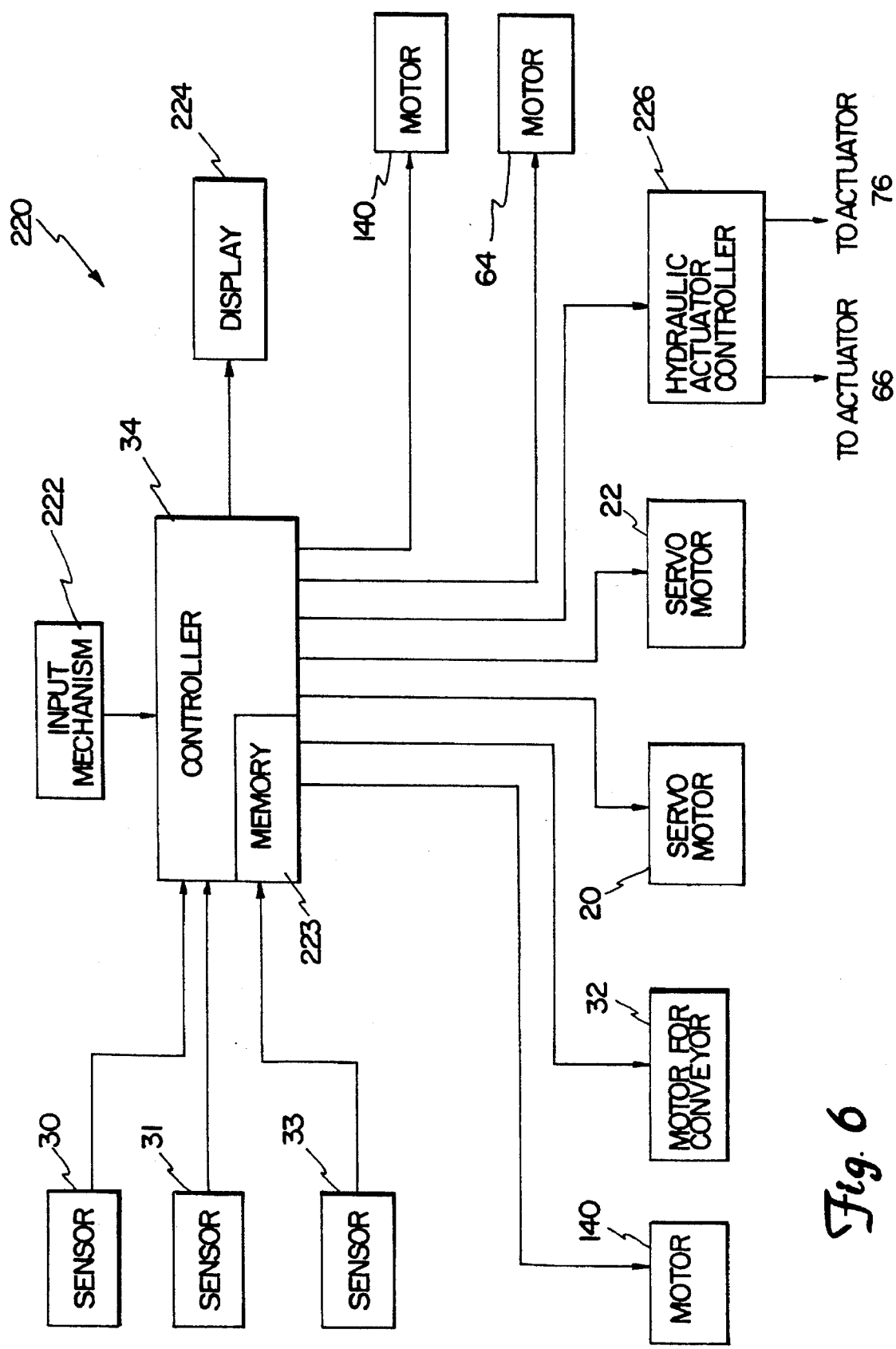
FIG. 6 is a block diagram of a control circuit for controlling the dough sheet former of the present invention.

FIG. 6 is a block diagram of a control circuit 220 for controlling dough sheet former 10. Controller 34 receives input signals from sensors 30, 31 and 33. Controller 34 also receives an input from input mechanism 22!2. In this preferred embodiment, input mechanism 222 is a keyboard or a membrane keypad input.

Based on the inputs received, controller 34 controls motor 140, thus controlling the speed of output conveyor 26 where conveyor 26 is driven by separate motor 140. Controller 34 also controls the motor for conveyor 32, servomotor 20, servomotor 22, motor 140 (to change the position of manifold 28) and motor 142 (which moves sensor 30 along slide rail 142).

Further, controller 34 includes memory 223 which is used for storing a number of programs. Based on the input received from the operator through input mechanism 222, controller 34 determines which of the programs stored in memory 223 is suitable. In other words, if the operator indicates that a certain type of cookie dough is being processed, controller 34 may choose one control program from memory 223. On the other hand, if the operator indicates that a bread dough is being processed, controller 34 may select another program from memory 223. Controller 34 may also select among the control programs stored in memory 223 based on inputs from the operator such as certain dough characteristics or characteristics of certain ingredients.

Controller 34 also displays certain items for operator observation at display unit 224. In one preferred embodiment, controller 34 displays the currently extruding volume, the control program number selected from memory 223 which is currently running, the height of manifold 28 above output conveyor 26, the measured dough thickness, and the machine cycle rate (e.g. the number of ram strokes per minute).

Finally, controller 34 controls hydraulic actuator controller 226. Hydraulic actuator controller 226 provides outputs to actuators 66 and 76 to control the actuators in accordance with control signals received from controller 34.

It should be noted that, in the preferred embodiment, controller 34 is a digital computer which is capable of receiving the input signals, and controlling the outputs by using discrete inputs and outputs, or by using a serial or parallel bus structure or any other suitable means.

Compensation and Control Structure

As discussed in the background of the invention, it is generally desirable in pastry processing to have a dough sheet which is extruded with a uniform weight or volume per unit of time during the extrusion, and which is free of stress. This may be difficult to achieve with prior art dough sheet formers for a number of reasons. If the finished dough temperature after mixing is relatively high, the specific gravity changes as time passes due to the activation of the yeast in the dough. As a result of this change in specific gravity, while the extruding volume is maintained essentially constant, the weight of the extruded dough decreases.

Controller 34 of the present invention controls dough sheet former 10 to achieve a substantially constant output. In one preferred embodiment, controller 34 controls dough sheet former 10 as follows:

if $K =$ a term represented by the product of dough extruding width × dough thickness × extrusion speed (determined based on the speed of table conveyor 32) × dough specific gravity, then controller 34 attempts to keep $K$ constant.     Eq. (1)

Therefore, as the specific gravity of the dough changes, controller 34 changes the extrusion speed to offset the change in specific gravity and keep K constant.

In controlling dough sheet former 10, controller 34 receives the initial value of specific gravity of the dough from an operator through input mechanism 222. Controller 34 also receives the maximum change in specific gravity to take place during a unit of time. Then, based on the time required to extrude the batch of dough, controller 34 determines how much the specific gravity term in equation 1 above will change during extrusion. Controller 34 then sets a time interval at which it updates the specific gravity term in equation 1 above, and in turn makes an offsetting adjustment to the extrusion speed based on the control program selected. This time interval can also be input by the operator.

For example, in a case where the initial specific gravity of the dough is 1.0, and the final specific gravity (at the end of the extrusion) is 0.8, then the change in specific gravity during extrusion of the batch is 0.2 (1.00-0.80). Assuming controller 34 has been programmed (either by the selected control program or by the operator) to adjust the extrusion speed based on every 2% change in specific gravity, controller 34 must make 10 adjustments during the extrusion of the batch (0.2 total change in specific gravity÷0.02 [a 2% change]=10). Also, assuming that the time required for processing the batch is 20 minutes, then controller 34 must update the extrusion speed and the specific gravity term in equation 1 above every two minutes (20 minutes÷10 changes=1 change every two minutes). Thus, the compensation pattern followed by controller 34 is to change the specific gravity term in equation 1 by 2% every two-minute interval. The control sequence would be as follows:

set the initial value of specific gravity to 1.00;

set the update interval in percent change of specific gravity to 2%;

set the time interval for each update to two minutes; and:

return the specific gravity term in equation 1 to its initial value following completion of the batch extrusion.

Controller 34 is also capable of controlling the output of dough extruder 10 to achieve a substantially constant volume. In one embodiment, dough extruder 10 periodically compares the actual volume being extruded, based on the speed of table conveyor 32 and the width and thickness measurements from sensor 30, with a set figure. In another embodiment, controller 34 averages a number of measurements taken by sensor 30, keeps a running average, and compares that average volume measurement to the set figure. Based on the comparison, controller 34 controls the cycle speed of dough sheet former 10 by controlling servomotors 20 and 22, and the conveyor speed of table conveyor 32 to hold the extruded volume substantially at the set figure.

In another preferred embodiment, controller 34 sets maximum and minimum limits on compensating the cycle speed of dough sheet 10. This substantially reduces overshoot and undershoot in compensation.

As one example, controller 34 calculates a compensating term using the following equation:

$$\Delta b = \frac{e}{100} \times \frac{(c-d)}{m} \quad \text{Eq. (2)}$$

if $\Delta b > f$, $\Delta b = f$;
if $\Delta b < g$, $\Delta b = g$;
where:

$\Delta b$=the change in frequency required for compensation;
$b$=the present frequency in hZ;
$c$=the desired extruded volume (in kilograms);
$d$=the actual extruded volume (in kilograms);
$e$=the percent compensation for the extruded volume;
$f$=the upper frequency compensation limit (in hZ);
$g$=the lower frequency compensation limit (in hZ); and
$m$=a desired constant.

The new frequency required to compensate for a change in specific gravity is determined as follows:

$$b_{NEW} = b + \Delta b \quad (3)$$

By using the above-mentioned equations, controller 34 is capable of controlling volume, the machine frequency, and the weight of the extruded dough sheet 46 based on sensor inputs, and based on input parameters provided by an operator.

Conclusion

The present invention provides closed loop servocontrol for dough sheet former 10 to obtain automated control of the extruded volume. The present invention also provides a desired clean-out cycle which cleans out any remaining dough in the hopper. Further, the present invention uses sensors to sense the actual volume extruded. These sensors provide signals which are used by controller 34 in achieving a closed control loop for desired operation. The present invention further provides a programmable controller which can be programmed with a number of control programs, and which can determine which is the best control program for use on a given dough type, based on physical dough characteristics provided by an operator. The overall result is an improved, stress-free dough sheet extruded at a controlled weight and volume.

Although the present invention has been described with reference to preferred embodiments, workers skilled in the art will recognize that changes may be made in form and detail without departing from the spirit and scope of the invention.

What is claimed is:

1. A dough sheet former for extruding dough, comprising:

a hopper having a first opening at a first end for receiving the dough and a second opening at a second end;

a first ram movable within a chamber, the chamber having an entrance opening proximate the second opening of the hopper for receiving dough from the hopper and an exit opening, wherein reciprocation of the ram within the chamber drives dough from the entrance opening out the exit opening;

a first driver, coupled to the first ram, for driving reciprocation of the first ram in the chamber;

a second ram, movable within the chamber adjacent the first ram, reciprocation of the second ram within the chamber driving dough from the entrance opening out the exit opening of the chamber; and a second driver, coupled to the second ram, for driving reciprocation of the second ram in the chamber;

a conveyor, coupled proximate the exit opening of the chamber, for moving dough away from the exit opening of the chamber;

a manifold, coupled adjacent the chamber, for forming the exit opening from the chamber and for forming the dough into a dough sheet having a desired thickness as the dough is driven through the exit opening;

a sensor, coupled proximate the conveyor, for sensing a desired characteristic of the dough sheet after it is driven through the exit opening; and a controller, coupled to the sensor and the first and second drivers, for controlling the first and second drivers based on the characteristic sensed by the sensor.

2. The dough sheet former of claim 1 wherein the controller comprises:

a speed controller for controlling driving speed of the rams within the chamber based on the characteristic sensed.

3. The dough sheet former of claim 1 wherein the controller comprises:

a distance controller for controlling a distance that the rams move within the chamber based on the characteristic sensed.

4. The dough sheet former of claim 1 wherein the controller comprises:

an input device for entering an operating parameter, wherein the controller controls the first and second drivers based on the characteristic sensed, and based on the operating parameter entered.

5. The dough sheet former of claim 4 wherein the operating parameter comprises physical properties of the dough, wherein the controller includes means for controlling the first and second drivers based on the characteristic sensed and based on the physical properties entered.

6. The dough sheet former of claim 5 wherein the operating parameter comprises a specific gravity parameter indicating a change in specific gravity of the dough over time, and wherein the sensor includes:

means for sensing a volume of dough extruded, the controller comprising means for controlling the first and second drivers based on the specific gravity parameter and based on the volume of dough extruded.

7. The dough sheet former of claim 1 wherein the controller comprises:

memory for storing a plurality of control programs; and an input device for receiving a control parameter wherein the controller chooses one of the plurality of control programs with which to control the first and second drivers based on the control parameter.

8. The dough sheet former of claim 1 wherein the conveyor moves the dough generally along a dough travel path, and wherein the dough sheet former further comprises:

a second sensor, located proximate the conveyor, for sensing the presence of the dough sheet on the conveyor along the travel path, wherein the second sensor provides a second sensor signal to the controller, the controller controlling the conveyor based on the second sensor signal.

9. The dough sheet former of claim 8 wherein the second sensor comprises:

a first optical sensor located a first distance from the chamber along the dough travel path;

a second optical sensor located a second distance from the chamber along the dough travel path, the second distance being less than the first distance; and wherein the first optical sensor provides a first optical sensor signal to the controller indicating the presence of dough along the travel path adjacent the first optical sensor, the second optical sensor providing a second optical sensor signal to the controller indicating the presence of dough along the travel path adjacent the second optical sensor, the controller controlling the conveyor to convey dough along the dough travel path when the first optical sensor signal indicates the presence of dough and the second optical sensor signal indicates that dough is not present.

10. The dough sheet former of claim 1 wherein the sensor comprises:

a sensor, mounted to the dough sheet former, and movable above the dough sheet in a direction transverse to the dough travel path, the controller controlling the sensor to move transverse to the dough travel path to detect a width and thickness of the dough sheet extruded, the sensor providing a sensor signal to the control means indicating the width and thickness of the dough sheet.

11. The dough sheet former of claim 1 and further comprising:

an actuator, coupled to the controller and the second ram, for increasing the travel distance of reciprocation of the second ram within the chamber, the controller actuating the actuator to increase the travel distance in response to an input command.

12. The dough sheet former of claim 1 wherein the manifold is adjustable to adjust the thickness of the dough sheet as it is driven through the exit opening.

13. The dough sheet former of claim 1 wherein the first driver comprises a first servomotor controlled by the controller and wherein the second driver comprises a second servomotor controlled by the controller.

14. A dough extruder for extruding a sheet of dough, comprising:

a hopper for holding dough to be extruded;

a plurality of rams, independently reciprocable within a chamber, the chamber having an entrance for receiving dough from the hopper and an exit, reciprocation of the rams driving the dough from the entrance out the exit to form the sheet of dough;

a driver, coupled to the rams, for driving reciprocation of the rams;

a sensor, coupled proximate the exit, for sensing a characteristic of the sheet of dough and generating sensor signal based on the characteristic sensed; and a controller, coupled to the sensor and the driver, for receiving the sensor signal and controlling the driver based on the sensor signal.

15. The dough extruder of claim 14 wherein the driver comprises:

a plurality of independently controllable servodrive motors, one of the plurality of servodrive motors coupled to each of the plurality of rams.

16. The dough extruder of claim 15 wherein the controller comprises:

an input device for accepting a control parameter indicative of a specific gravity of the dough to be extruded, the controller controlling the speed of reciprocation of the rams based on the control parameter and the sensor signal.

17. A dough extruder for extruding a sheet of dough, comprising:

a hopper for holding dough to be extruded;

an extruder, coupled to the hopper, the extruder having a chamber and first and second rams movable therein for extruding the sheet of dough from the hopper;

a servodriver, coupled to the extruder, for driving the extruder to extrude the sheet of dough, the sheet of dough moving along a dough travel path after being extruded;

a sensor, movably mounted proximate the dough travel path, movable in a direction transverse to the dough travel path, for sensing a width and thickness of the sheet of dough being extruded and being on the dough travel path and generating a sensor signal based on the width and thickness; and a controller, coupled to the sensor and the servodriver, for causing the sensor to move in a direction transverse to the dough travel path to sense the width and thickness of the sheet of dough, and for receiving the sensor signal and controlling the servodriver based on the sensor signal.

18. The dough extruder of claim 17 and further comprising:

an input device, coupled to the controller, for inputting a control parameter, the controller controlling the extruder based on the sensor signal and based on the control parameter.

19. The dough extruder of claim 18 wherein the control parameter comprises a specific gravity parameter indicating a rate of change of specific gravity of the dough with respect to time, the controller determining a volume of dough being extruded per unit of time based on the sensor signal and controlling the volume of dough being extruded in the sheet of dough based on the specific gravity parameter to achieve a substantially constant weight of dough extruded per unit of time.

20. The dough extruder of claim 18 wherein the control parameter comprises a desired volume extruded per unit of time, the controller controlling a volume of dough extruded to substantially meet the desired volume.

21. A dough extruder, comprising:

a hopper for receiving dough;

an extruder, coupled to the hopper, the extruder having a chamber and first and second rams movable therein for extruding dough in a dough sheet;

a conveyor, coupled to the extruder, for intermittently conveying the dough sheet away from the extruder along a dough travel path;

a sensor for sensing a characteristic of the dough sheet indicative of a quantity of dough being extruded in the dough sheet and for providing a quantity signal based on the characteristic sensed;

a driver, coupled to the extruder, for driving the extruder;

a controller, coupled to the sensor, and the conveyor, the controller for controlling the driver and for intermittently operating the conveyor based on the quantity signal; and an input device, coupled to the controller, for inputting a specific gravity parameter to the controller, the specific gravity parameter being based on a rate of change of specific gravity of the dough, the controller controlling the driver, based on the specific gravity parameter and the quantity signal, so the extruder extrudes a volume of dough so the dough sheet tends toward a substantially constant weight per unit of time.

* * * * *